United States Patent
Williams et al.

(10) Patent No.: US 10,099,659 B1
(45) Date of Patent: Oct. 16, 2018

(54) VEHICLE VACUUM MODULE AND METHODS OF INSTALLING SAME

(71) Applicant: Emerson Electric Co., St. Louis, MO (US)

(72) Inventors: Matthew A. Williams, Bridgeton, MO (US); Katherine Hagerty, Winfield, IL (US); David Martele Goggans, St. Louis, MO (US); Mark J. Tomasiak, St. Peters, MO (US); Jason Hill, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 15/495,230

(22) Filed: Apr. 24, 2017

(51) Int. Cl.
| | |
|---|---|
| B60S 1/64 | (2006.01) |
| B60R 7/04 | (2006.01) |
| A47L 5/38 | (2006.01) |
| A47L 7/00 | (2006.01) |
| A47L 9/14 | (2006.01) |
| A47L 9/28 | (2006.01) |
| B60S 3/00 | (2006.01) |

(52) U.S. Cl.
CPC . B60S 1/64 (2013.01); A47L 5/38 (2013.01); A47L 7/0076 (2013.01); A47L 9/1409 (2013.01); A47L 9/1463 (2013.01); A47L 9/2884 (2013.01); B60R 7/04 (2013.01); B60S 3/008 (2013.01)

(58) Field of Classification Search
CPC .............. B60S 1/62; B60S 1/64; B60S 3/008
USPC .......................................................... 15/313
See application file for complete search history.

(56) References Cited

U.S. PATENT DOCUMENTS

| | | | |
|---|---|---|---|
| 4,209,875 A | * | 7/1980 | Pugh .................... A47L 5/24 |
| | | | 15/344 |
| 5,189,753 A | | 3/1993 | Sousa et al. |
| 5,829,091 A | | 11/1998 | Ingram et al. |
| 6,490,751 B2 | | 12/2002 | Genzenmuller et al. |
| 6,497,443 B2 | | 12/2002 | Worrell et al. |
| 6,813,805 B2 | | 11/2004 | Ganzenmuller |
| 7,152,272 B2 | * | 12/2006 | Rukavina ............. A47L 7/0076 |
| | | | 15/313 |
| 7,231,686 B1 | | 6/2007 | Matheney |

(Continued)

FOREIGN PATENT DOCUMENTS

| | | |
|---|---|---|
| CN | 2871268 Y | 2/2007 |
| DE | 19916199 A1 | 10/2000 |

(Continued)

*Primary Examiner* — Dennis H Pedder
(74) *Attorney, Agent, or Firm* — Armstrong Teasdale LLP (57) ABSTRACT

A vacuum module for installation in a console located in a passenger compartment of a vehicle includes a housing defining a receptacle, a debris container received within the receptacle and removably connected to the housing by a latch, and a motor connected to the housing and operable to generate air flow through the debris container from an inlet of the vacuum module to an outlet of the vacuum module. The housing includes a mounting flange that engages a mounting surface of the console to secure the vacuum module within a storage cavity of the console. The debris container includes a filter assembly removably connected to a base of the debris container. The vacuum module defines a single unit that is removable from the console.

18 Claims, 12 Drawing Sheets

(56) References Cited

U.S. PATENT DOCUMENTS

| | | | |
|---|---|---|---|
| 7,266,859 B2 * | 9/2007 | Slone | B60S 1/64 |
| | | | 15/313 |
| 7,480,957 B2 | 1/2009 | Ganzenmuller et al. | |
| 7,513,007 B2 | 4/2009 | Chernoff | |
| 8,286,300 B2 | 10/2012 | Norell et al. | |
| 8,312,590 B2 | 11/2012 | Norell et al. | |
| 8,347,452 B2 | 1/2013 | Maehata et al. | |
| 8,615,845 B2 | 12/2013 | Norell et al. | |
| 8,714,613 B1 * | 5/2014 | Gillis | B60R 7/04 |
| | | | 296/24.34 |
| 9,003,600 B2 | 4/2015 | Norell et al. | |
| 9,561,753 B1 * | 2/2017 | Mendoza Vera | B60R 7/04 |
| 2004/0107528 A1 | 6/2004 | LeClear et al. | |
| 2004/0154122 A1 | 8/2004 | Xu | |
| 2006/0080801 A1 | 4/2006 | Nameth | |
| 2006/0267552 A1 * | 11/2006 | Baer | H02J 7/0054 |
| | | | 320/128 |
| 2009/0019662 A1 | 1/2009 | Yona et al. | |
| 2010/0043168 A1 | 2/2010 | Johnson et al. | |
| 2010/0083456 A1 | 4/2010 | Norell et al. | |
| 2013/0232724 A1 * | 9/2013 | Krebs | A47L 5/28 |
| | | | 15/353 |
| 2014/0165323 A1 | 6/2014 | Norell et al. | |
| 2015/0283979 A1 | 10/2015 | Oh et al. | |

FOREIGN PATENT DOCUMENTS

| | | |
|---|---|---|
| JP | H08104205 A | 4/1996 |
| JP | H10024808 A | 1/1998 |
| JP | 2005319855 A | 11/2005 |
| JP | 2006212121 A | 8/2006 |

\* cited by examiner

VEHICLE VACUUM MODULE AND METHODS OF INSTALLING SAME

FIELD

The field of the disclosure relates generally to vacuum cleaning systems, and more particularly, to vacuum modules installed in vehicles.

BACKGROUND

Traditionally, cleaning or vacuuming the interior of a vehicle required the use of exterior household vacuum cleaners and related attachments, or alternatively, the use of fixed vacuum systems typically installed outside of commercial car washes. Such traditional methods have several drawbacks. For example, household vacuum cleaners generally required that the cleaning operation occur near a source of AC electrical power, such as within a garage or near a residence. Additionally, use of household vacuum cleaners requires that the vacuum cleaner be moved around the vehicle to access different compartments within the vehicle. Use of vacuum systems at commercial carwashes present several inconveniences for users, such as having to travel to a separate location to clean the vehicle, and use of coin-operated, time-limited vacuum systems.

More recently, vehicle vacuum cleaning systems have been developed for dedicated use within a vehicle. While such vehicle vacuum cleaning systems may provide advantages over more traditional methods of cleaning vehicles, improvements are still needed in existing vehicle vacuum cleaning systems. For example, at least some known vehicle vacuum cleaning systems occupy an undesirable amount of space within the vehicle, and/or are located at locations within the vehicle that make operation of the vacuum cleaning system burdensome or inconvenient. Moreover, at least some known vehicle vacuum cleaning systems require extensive vehicle modifications to accommodate such vacuum cleaning systems. These modifications increase the cost, time, and complexity associated with installation of vehicle vacuum cleaning systems.

Accordingly, a need exists for improved vehicle vacuum cleaning systems that facilitate ease of installation, more convenient operation, and reducing or minimizing the amount of interior space occupied by the vehicle vacuum cleaning system.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vehicle includes a console located in a passenger compartment of the vehicle, and a vacuum module installed in the console. The console defines a storage cavity and an opening in a top of the console that provides access to the storage cavity. The vacuum module includes an inlet, an outlet, and a receptacle. The vacuum module further includes a housing that defines the receptacle, a debris container that is received within the receptacle and removably connected to the housing by a latch, and a motor connected to the housing and operable to generate air flow through the debris container from the inlet to the outlet. The housing includes a mounting flange that engages a mounting surface of the console to secure the vacuum module within the storage cavity. The debris container includes a filter assembly removably connected to a base of the debris container. The vacuum module defines a single unit that is removable from the console.

In another aspect, a method of installing a vacuum module in a vehicle includes positioning the vacuum module within a storage cavity of a console of the vehicle located in a passenger compartment of the vehicle. The vacuum module includes a housing defining a receptacle, a debris container that is received within the receptacle and removably connected to the housing by a latch, a filter assembly removably connected to a base of the debris container, and a motor connected to the housing and operable to generate air flow through the debris container. The method further includes securing the vacuum module within the storage cavity by engaging a mounting surface of the console with a mounting flange of the vacuum module housing.

In yet another aspect, a vacuum module for installation in a console located in a passenger compartment of a vehicle includes a housing defining a receptacle, a debris container received within the receptacle and removably connected to the housing by a latch, and a motor connected to the housing and operable to generate air flow through the debris container from an inlet of the vacuum module to an outlet of the vacuum module. The housing includes a mounting flange that engages a mounting surface of the console to secure the vacuum module within a storage cavity of the console. The debris container includes a filter assembly removably connected to a base of the debris container. The vacuum module defines a single unit that is removable from the console.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 1:
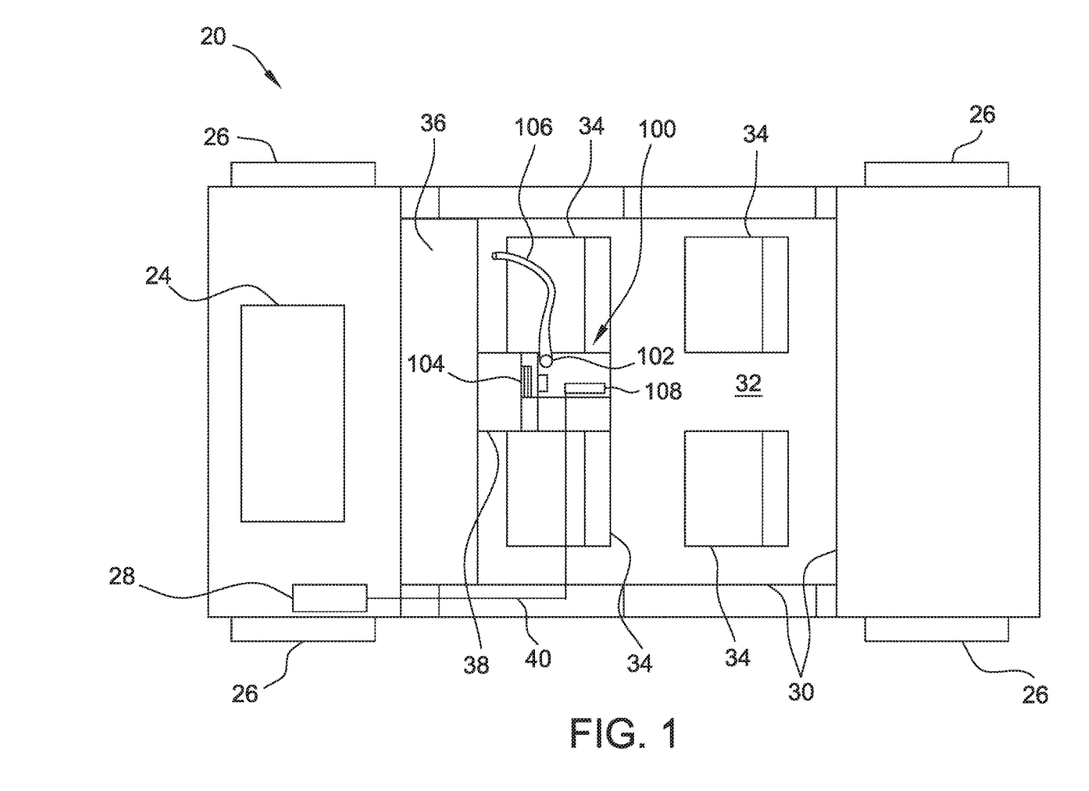
FIG. 1 is a schematic view of a vehicle including an example vacuum module.

FIG. 1 is a schematic view of a vehicle 20 including an example vacuum module 100. The vacuum module 100 is mounted or installed on the vehicle 20 to enable vacuum cleaning of the vehicle 20 with the vacuum module 100. The vacuum module 100 may be installed as a stock component on the vehicle 20 (e.g., at the time of vehicle production), or as an aftermarket component of the vehicle 20.

In the example embodiment, the vehicle 20 is an automobile, and generally includes a frame (not shown), a propulsion system 24, a plurality of wheels 26 rotatably connected to the vehicle frame, and a transmission (not shown) connecting the propulsion system 24 to one or more of the wheels 26. The propulsion system 24 may include any suitable engine or motor that provides power for propelling the vehicle 20. The propulsion system 24 may include, for example and without limitation, a gasoline powered engine, an electric motor, and combinations thereof. The transmission is connected to the propulsion system 24 such that power from the propulsion system 24 is transmitted through the transmission, to a drivetrain (not shown), and to the wheels 26 to propel the vehicle 20. Examples of automobiles in which the vacuum module 100 may be installed include, for example and without limitation, cars, trucks, sport utility vehicles, vans, and minivans. In other embodiments, the vehicle 20 may be a vehicle other than an automotive vehicle including, for example and without limitation, a recreational vehicle, a watercraft, or an aircraft.

The vehicle 20 also includes an energy storage device 28 configured to store electric energy and supply electrical power to one or more components of the vehicle 20. In some embodiments, the energy storage device 28 is configured to supply electrical power in the form of a direct current, and act as a DC power supply. In other embodiments, the energy storage device 28 may supply power to components of vehicle 20 in any suitable manner that enables the vehicle 20 and the vacuum module 100 to function as described herein. The energy storage device 28 may include, for example and without limitation, a rechargeable battery, such as a lead-acid battery or a lithium-ion battery. The energy storage device 28 may be operatively connected to one or more components of the vehicle 20, such as an alternator, that generates electrical energy during operation of the vehicle 20. In the example embodiment, the vacuum module 100 is electrically connected to the energy storage device 28 to receive electrical power therefrom. In other embodiments, vacuum module 100 may be connected to a power supply other than energy storage device 28.

In the example embodiment, the vehicle 20 also includes a plurality of panels 30 connected, directly or indirectly, to the frame of the vehicle 20. The vehicle panels 30 divide and/or separate the vehicle 20 into multiple compartments or spaces, including an interior cabin or passenger compartment 32. The passenger compartment 32 is generally configured to house passengers or occupants of the vehicle 20, and includes a plurality of seats 34 for supporting passengers within the passenger compartment 32. The passenger compartment 32 also includes a dashboard or instrument panel 36 and a floor-mounted center console 38 disposed between two of the seats 34.

In this embodiment, the vacuum module 100 is installed in the floor-mounted center console 38 located in the passenger compartment 32 between the front seats 34 of the vehicle 20. In other embodiments, the vacuum module 100 may be installed in a console other than the front center console 38 of the vehicle 20, such as a console located between two rear seats of the vehicle 20.

As shown in FIG. 1, the vacuum module 100 includes an inlet 102 and an outlet 104. A suction unit of the vacuum module 100, described in more detail below, generates air flow through the vacuum module 100 from the inlet 102 to the outlet 104. A conduit or hose 106 is selectively connectable to the inlet 102 such that suction generated by the vacuum module 100 can be selectively directed to desired locations within the vehicle 20 to entrain dust and other debris within the air flow generated by the vacuum module 100.

The suction unit of the vacuum module 100 may be powered by any suitable power source that enables the vacuum module 100 to function as described herein. In some embodiments, for example, the vacuum module 100 may be connected to the energy storage device 28 of the vehicle 20 to supply power to a motor of the vacuum module 100.

In other embodiments, the vacuum module 100 may include an auxiliary or dedicated battery for supplying power to the vacuum module 100. In this embodiment, for example, the vacuum module 100 includes a dedicated battery 108 that is selectively connectable to a battery receptacle (not shown in FIG. 1) of the vacuum module 100 to supply power thereto. Further, in this embodiment, the battery 108 is a rechargeable battery, and is connected to the energy storage device 28 of the vehicle 20 by a suitable electrical conduit or wire 40 to permit charging of the battery 108. Use of a dedicated battery 108, as compared to the vehicle energy storage device 28, to power the vacuum module 100 reduces the need for routing large gauge wires to the vacuum module 100 for supplying power thereto. Accordingly, the electrical wire 40 is a relatively small gauge wire, such as a wire having a gauge size of about 20 gauge according to the American Wire Gauge system (AWG). In some embodiments, the electrical wire 40 has a gauge size of no larger than 16 AWG and, more specifically, has a gauge size of between 16 AWG and 26 AWG. In other embodiments, the wire 40 may have a gauge size larger than 16 AWG or smaller than 26 AWG.

Figure 2:
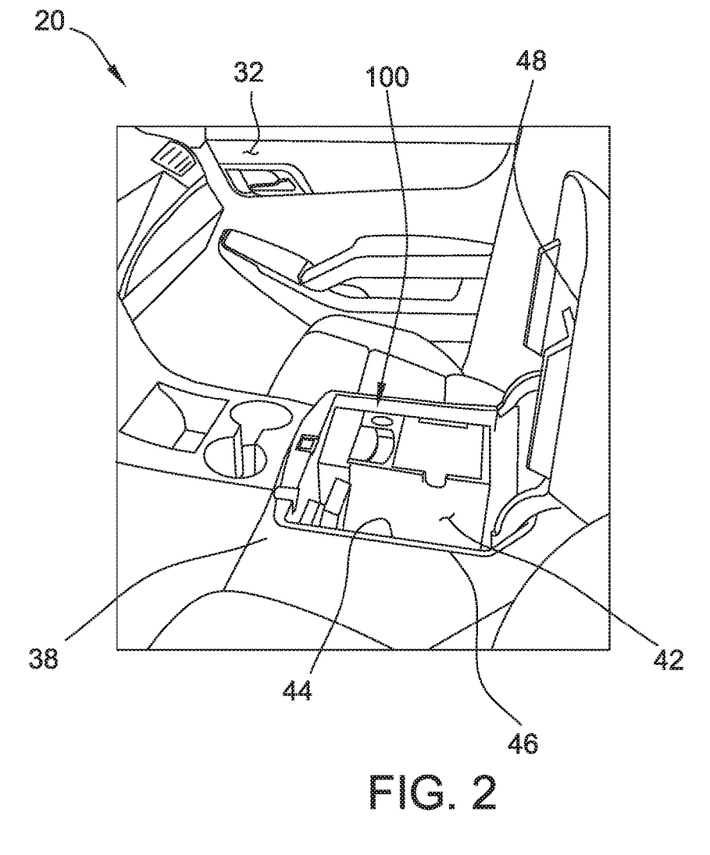
FIG. 2 is a perspective view of a portion of the vehicle shown in FIG. 1.

FIG. 2 is a perspective view of a portion of the passenger compartment 32 of the vehicle 20. As shown in FIG. 2, the center console 38 defines a storage cavity 42 designed to hold articles or accessories of users of the vehicle 20. The vacuum module 100 is sized and shaped to be received within the storage cavity 42, and may be installed or removed from the console 38 as a single unit. The storage cavity 42 and the vacuum module 100 are accessible through an opening 44 defined in a top 46 of the console 38. Further, in this embodiment, the console 38 includes a lid 48 connected to the console 38 and selectively moveable between an open position (shown in FIG. 2) and a closed position. When the lid 48 is in the open position, the vacuum module 100 is accessible through the opening 44. When the lid 48 is in the closed position, the lid 48 covers or occludes the storage cavity 42 and prevents access to the vacuum module 100. In this embodiment, the lid 48 is connected, e.g., by a hinge, to the console 38, and rotates between the open and closed positions. In other embodiments, the lid 48 may be connected to the console 38 by any other suitable connection means that allows the vacuum module 100 to function as described herein.

Figure 3:
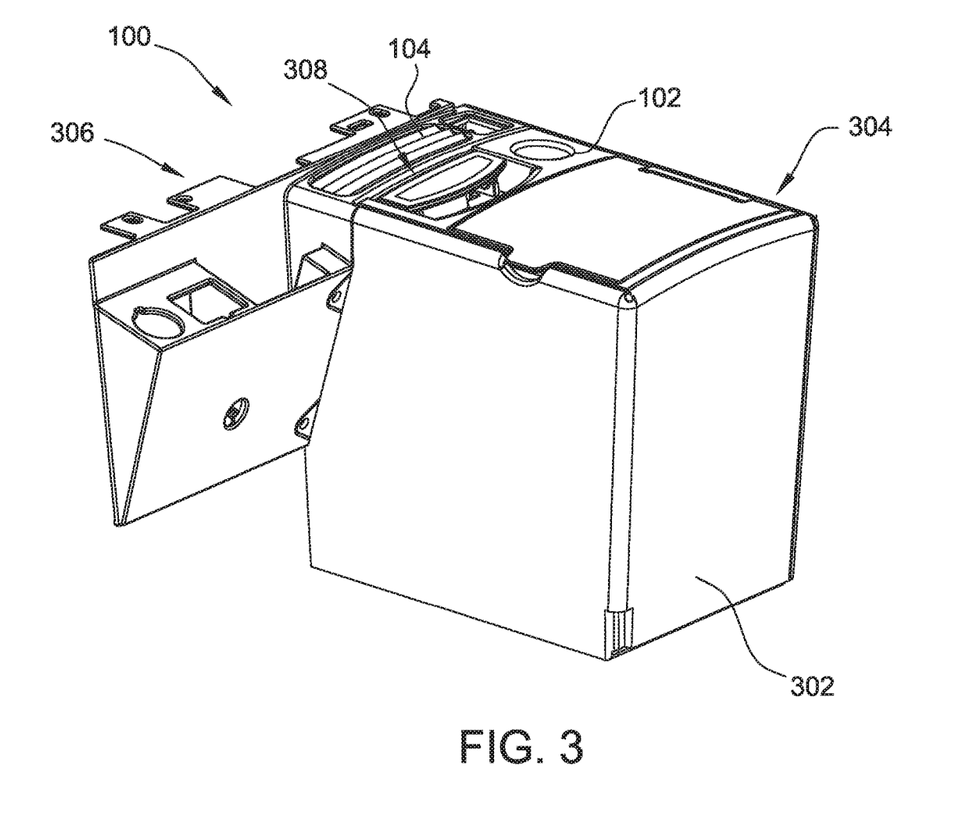
FIG. 3 is a perspective view of the vacuum module shown in FIG. 1.
Figure 4:
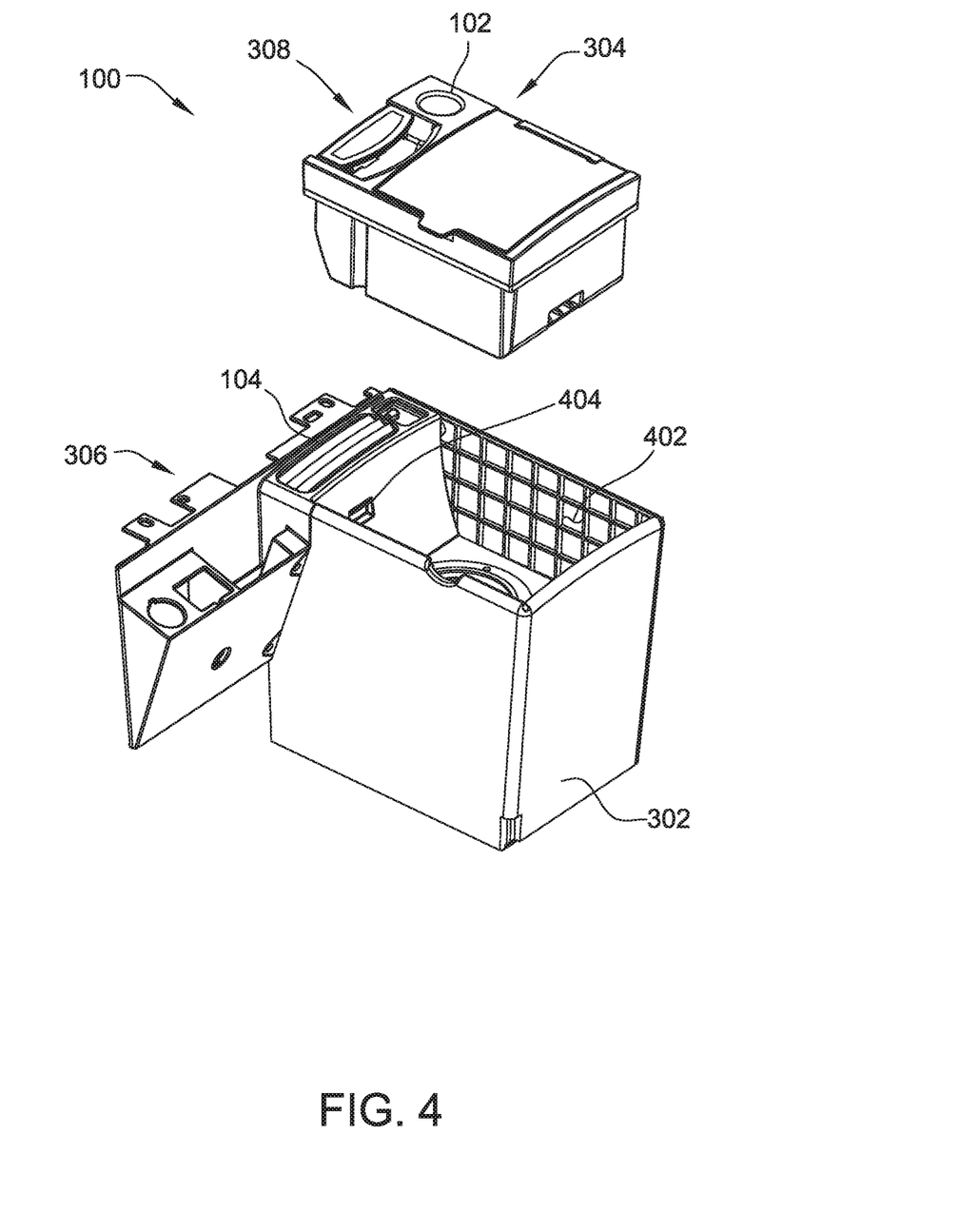
FIG. 4 is a partially exploded view of the vacuum module shown in FIG. 3.

FIG. 3 is a perspective view of the vacuum module 100, and FIG. 4 is a partially exploded view of the vacuum module 100. As shown in FIGS. 3 and 4, the vacuum module 100 includes a housing 302 that defines a receptacle 402, and a debris container 304 that is received within the receptacle 402. In this embodiment, the inlet 102 is defined by the debris container 304, and the outlet 104 is defined by the housing 302. Additionally, in this embodiment, the housing 302 includes a mounting flange 306 that engages a mounting surface of the console 38 to secure the vacuum module 100 within the storage cavity 42, as described in more detail below.

The debris container 304 includes an interior (not shown in FIGS. 3 and 4) in which debris and other material collected by the vacuum module 100 are stored. The debris container 304 is removably connected to the housing 302 by a latch 308 such that the debris container 304 can be disconnected from the housing 302 to dispose of debris and other material collected within the debris container 304 during operation of the vacuum module 100.

Figure 5:
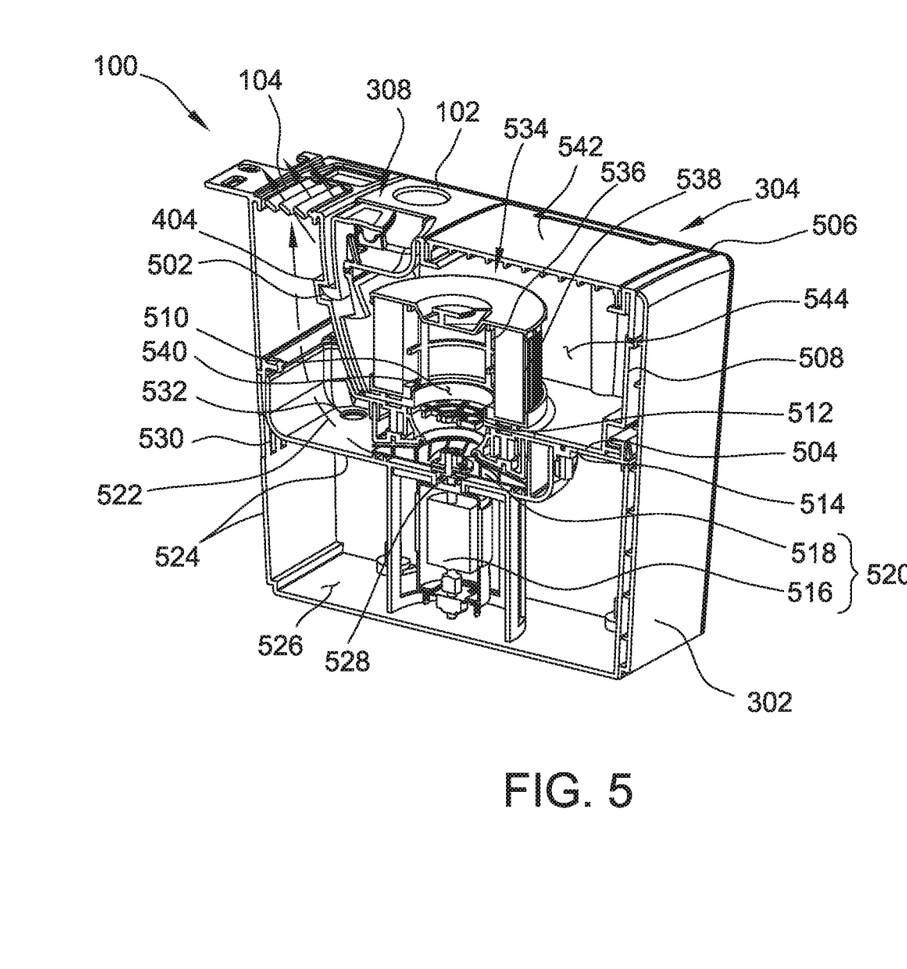
FIG. 5 is a sectional view of the vacuum module shown in FIG. 3.

With additional reference to FIG. 5, in this embodiment, the latch 308 includes a hook 502 that engages a slot 404 defined by the housing 302 to prevent or inhibit release of the debris container 304 from the housing 302. The latch 308 is rotatable between a first, latched position (shown in FIG. 5) in which the hook 502 engages the housing 302, and a second, unlatched position in which the hook 502 is disengaged from the housing 302 such that the debris container 304 can be removed from the receptacle 402. The latch 308 is rotatable between the latched and unlatched position with a single hand such that the debris container 304 can be installed and removed from the housing 302 with a single hand.

The debris container 304 includes a bottom or base 504, a top 506, and at least one sidewall 508 extending upward from the base 504 and between the base 504 and the top 506. The debris container 304 has a vacuum opening 510 defined in the base 504 that provides fluid communication or flow between the inlet 102 and the outlet 104 when the debris container 304 is installed in the receptacle 402. Specifically, when the debris container 304 is inserted in the receptacle 402, the vacuum opening 510 is aligned with a vacuum opening 512 defined in a receptacle wall 514 that defines the receptacle 402. The debris container base 504 engages the receptacle wall 514 when the debris container 304 is positioned within the receptacle 402 such that a seal is formed between the debris container 304 and the housing 302, thereby sealing the vacuum openings 510, 512. In some embodiments, the debris container 304 and/or the housing 302 may include a seal, such as a ring gasket, disposed between the base 504 of the debris container 304 and the housing receptacle wall 514 to facilitate sealing the vacuum openings 510, 512.

As shown in FIG. 5, the vacuum module 100 further includes a motor 516 and an impeller or blower 518 operably connected to the motor 516. The motor 516 and the blower 518 are collectively referred to herein as a suction unit 520, and are operable to generate air flow through the vacuum module 100 upon operation of the motor 516. In particular, rotation of the blower 518 generates a negative pressure at the vacuum opening 510, thereby drawing air into the debris container 304 through the inlet 102, and through the vacuum openings 510, 512. Air flow induced by rotation of the blower 518 is directed out of the vacuum module 100 via a suction flow path 522 defined by the housing 302. The air flow is exhausted from the housing 302 through the outlet 104.

In this embodiment, the housing 302 includes a plurality of sub-housings or compartments that house different operational components of the vacuum module 100. Each sub-housing or compartment is defined by plurality of housing panels 524, and is separated from adjacent housing compartments by at least one of the housing panel 524. In this embodiment, the housing 302 includes a motor compartment 526 that houses the motor 516, and a blower compartment 528 that houses the blower 518.

The motor compartment 526 includes a plurality of ventilation openings 530 that permit air flow into the motor compartment 526 from the surrounding environment to cool the motor 516 during operation. This air flow may be induced, for example, in part by operation of the motor 516. The motor compartment 526 is separated from the suction flow path 522 by one of the housing panels 524. The housing panel 524 has an opening 532 defined therein that provides fluid communication between the motor compartment 526 and suction flow path 522. Consequently, in this embodiment, air flow through the suction flow path 522 reduces back pressure within the motor compartment 526, and thereby induces a cooling air flow through the motor compartment 526 to facilitate cooling the motor 516 during operation.

Moreover, in this embodiment, the outlet 104 is a common exhaust outlet 104 through which both the cooling air flow from the motor compartment 526 and suction air flow from the suction flow path 522 are exhausted. Use of a common exhaust outlet that combines the working air flow of the suction unit 520 and the cooling air flow through the motor compartment 526 facilitates reducing the temperature of the cooling air flow exhaust by diluting the relatively hot cooling air flow exhaust with relatively cool working air flow.

Still referring to FIG. 5, the debris container 304 further includes a filter assembly 534 connected to the base 504 for filtering air flow through the vacuum module 100. The filter assembly 534 includes a frame 536 and a filter media 538 supported by the frame 536. The filter assembly 534 is removably connected to the base 504 such that the filter assembly 534 may be removed and cleaned and/or replaced with another filter assembly.

Figure 6:
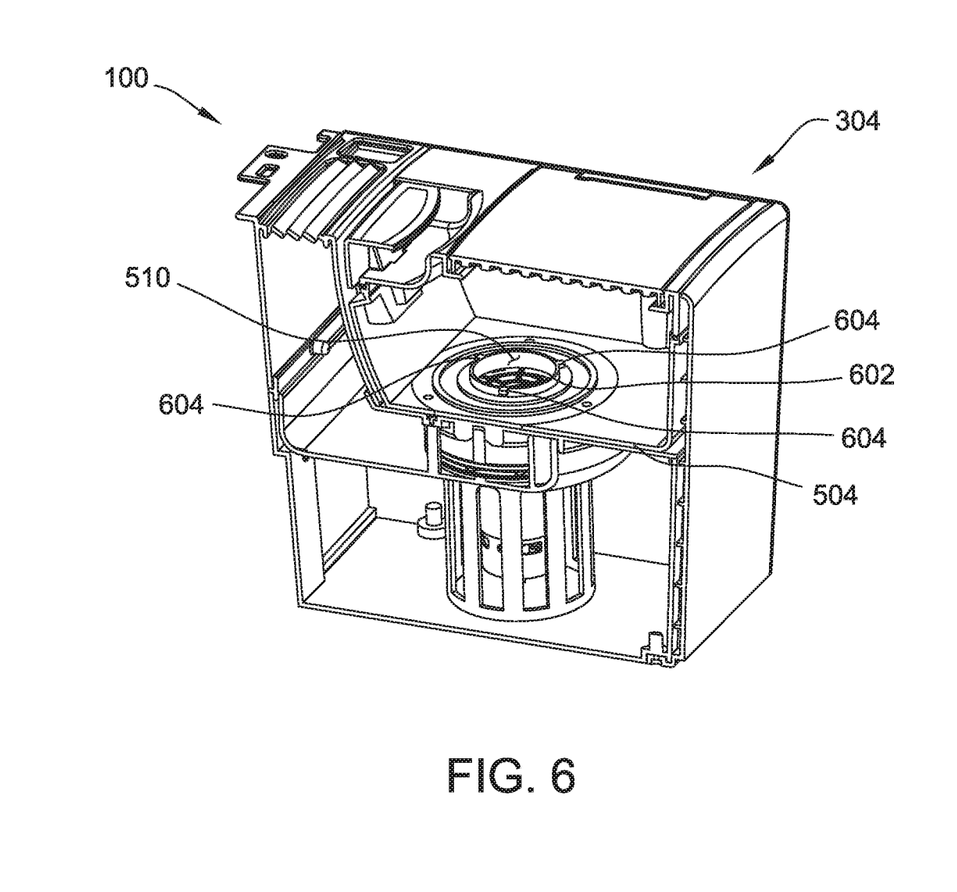
FIG. 6 is another sectional view of the vacuum module shown in FIG. 3 with a filter assembly removed.

FIG. 6 is a sectional view of the vacuum module 100 with the filter assembly 534 removed from the debris container 304. As shown in FIG. 6, the debris container 304 includes a mounting boss 602 that extends from the base 504 and around the vacuum opening 510. The filter assembly 534 is removably connected to the mounting boss 602 such that the filter assembly 534 filters air flow through the vacuum opening 510. In this embodiment, the filter assembly 534 is removably connected to the mounting boss 602 by a bayonet connection. Specifically, the mounting boss 602 includes a plurality of pins 604 extending radially outward from the mounting boss 602. The pins 604 are spaced circumferentially around the boss 602 an equal distant from one another, and are sized and shaped to be received within corresponding L-shaped slots 540 (FIG. 5) defined in the filter frame 536. In other embodiments, the filter assembly 534 may be removably connected to the debris container 304 by any other suitable connection means that enables the vacuum module 100 to function as described herein.

Figure 7:
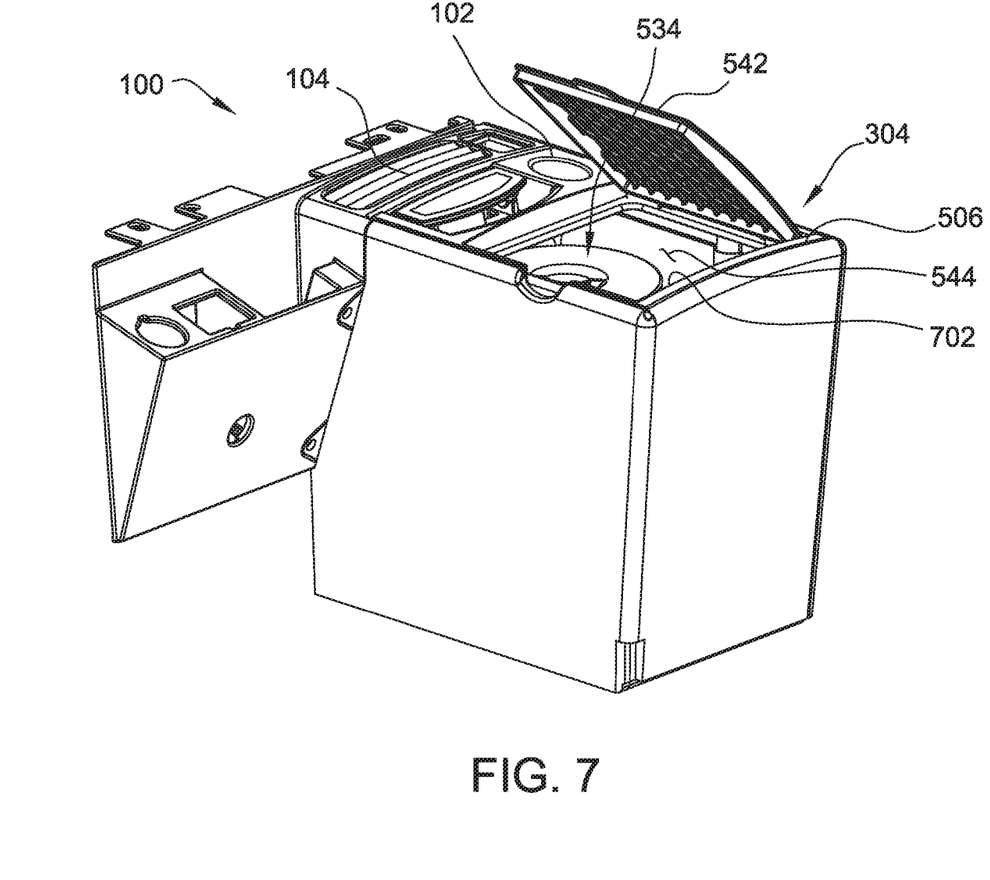
FIG. 7 is another perspective view of the vacuum module shown in FIG. 3 with an access lid of the vacuum module shown in an open position.

Referring again to FIG. 5, in this embodiment, the debris container 304 further includes an access lid 542 that facilitates access to the interior 544 of the debris container 304, e.g., for cleaning and/or replacing filter assembly 534. The access lid 542 is connected to the top 506 of the debris container 304, and provides selective access to an interior 544 of the debris container 304. Specifically, the access lid 542 is selectively moveable between an open position (shown in FIG. 7), in which the interior 544 of the debris container 304 is accessible through an access opening 702 defined in the top 506 of the debris container 304, and a closed position (shown in FIG. 5), in which the access lid 542 occludes the access opening 702. The access opening 702 is sized and shaped to permit the filter assembly 534 to pass therethrough such that the filter assembly 534 can be removed through the access opening 702. In this embodiment, the access lid 542 is connected by a hinge to the top 506 of the debris container 304. In other embodiments, the access lid 542 may be connected to the debris container 304 by any suitable means that enables the vacuum module 100 to function as described herein, such as slidably connected or rotatably connected.

Figure 8:
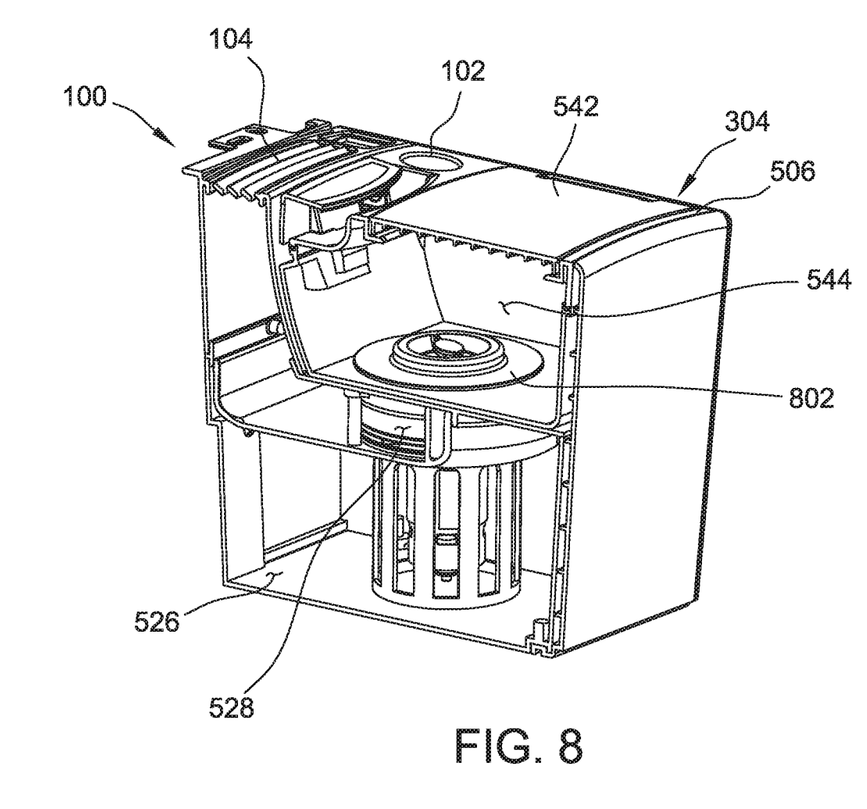
FIG. 8 is another sectional view of the vacuum module shown in FIG. 3, with the vacuum module shown in a trash receptacle configuration.

In this embodiment, the vacuum module 100 is configurable between a vacuum configuration and a trash receptacle configuration. Specifically, with reference to FIG. 8, the vacuum module 100 includes an adapter 802 that is removably connectable to the mounting boss 602 (FIG. 6) when the filter assembly 534 is disconnected from the mounting boss 602. The adapter 802 occludes the vacuum opening 510 (FIG. 5) when connected to the mounting boss 602 so as to prevent debris or other materials from passing through the vacuum opening 510 and into the blower compartment 528 or the motor compartment 526. Additionally, in the illustrated embodiment, the adapter 802 engages the debris container base 504 (FIG. 5) to seal off the vacuum opening 510 (FIG. 5). The adapter 802 thereby facilitates use of the debris container 304 as a trash receptacle when the vacuum module 100 is not used for vacuuming. For example, a user of the vehicle 20 may deposit trash in the debris container 304 by opening the access lid 542, and depositing the trash into the interior 544 of the debris container 304 through the access opening 702. The adapter 802 prevents debris or other material within the debris container 304 from falling down into the blower compartment 528 or the motor compartment 526.

Embodiments of the vacuum module 100 described herein facilitate installation and removal of the vacuum module 100 in vehicle consoles, such as the center console 38 (FIGS. 1 and 2). In some embodiments, for example, the vacuum module 100 defines a single unit. That is, all components of the vacuum module 100 are housed within and/or secured to the housing 302 and the air management system of the vacuum module 100 (e.g., the suction unit 520, the inlet 102, the outlet 104, the suction flow path 522, and the filter assembly 534) is contained entirely within the vacuum module 100. Consequently, the vacuum module 100 can be installed and uninstalled from vehicle consoles as a single unit, with little or no vehicle modifications required (such as the addition of air ducts or routing).

Figure 9:
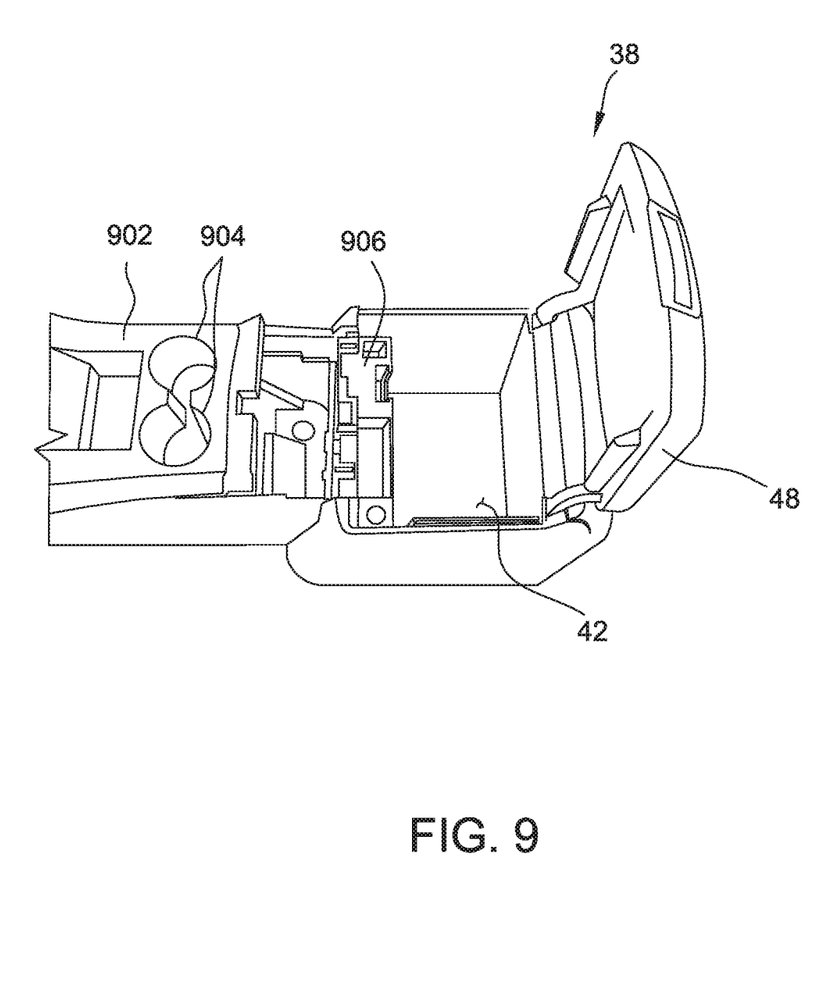
FIGS. 9-12 are perspective views of a portion of the vehicle shown in FIG. 2, illustrating a series of steps in an example method of installing the vacuum module shown in FIG. 3 in the vehicle.
Figure 10:
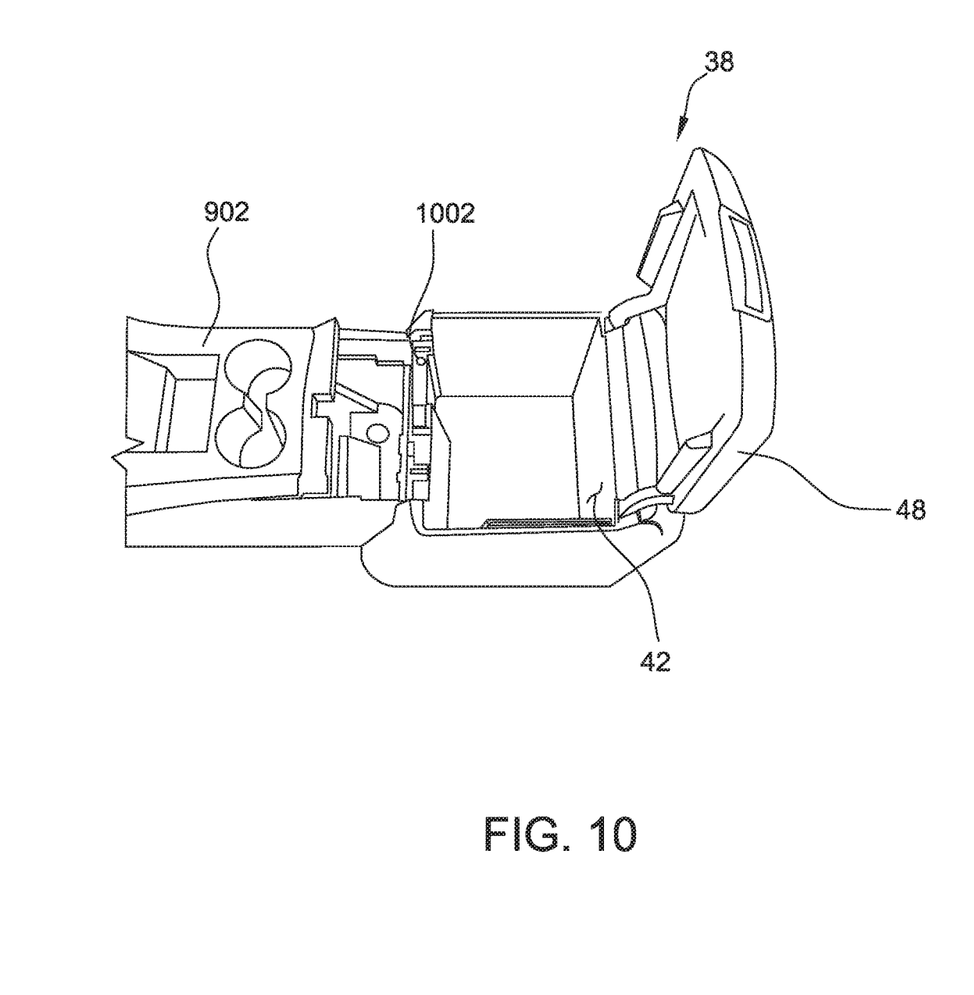

FIGS. 9-12 are perspective views of the center console 38 illustrating a series of steps in an example method of installing the vacuum module 100 in the vehicle 20 (FIG. 1). As shown in FIG. 9, the console lid 48 is initially moved to the open position such that the storage cavity 42 can be accessed. With the console lid 48 in the opened position, a console panel 902 is removed or disconnected from the console 38. In this embodiment, the console panel 902 is the front storage or "cup holder" section of the console 38, and includes two cup holders 904.

With the console panel 902 disconnected from the console 38, an accessory tray 906 is removed from the storage cavity 42 to expose a mounting surface 1002 (FIG. 10) of the console 38.

Figure 11:
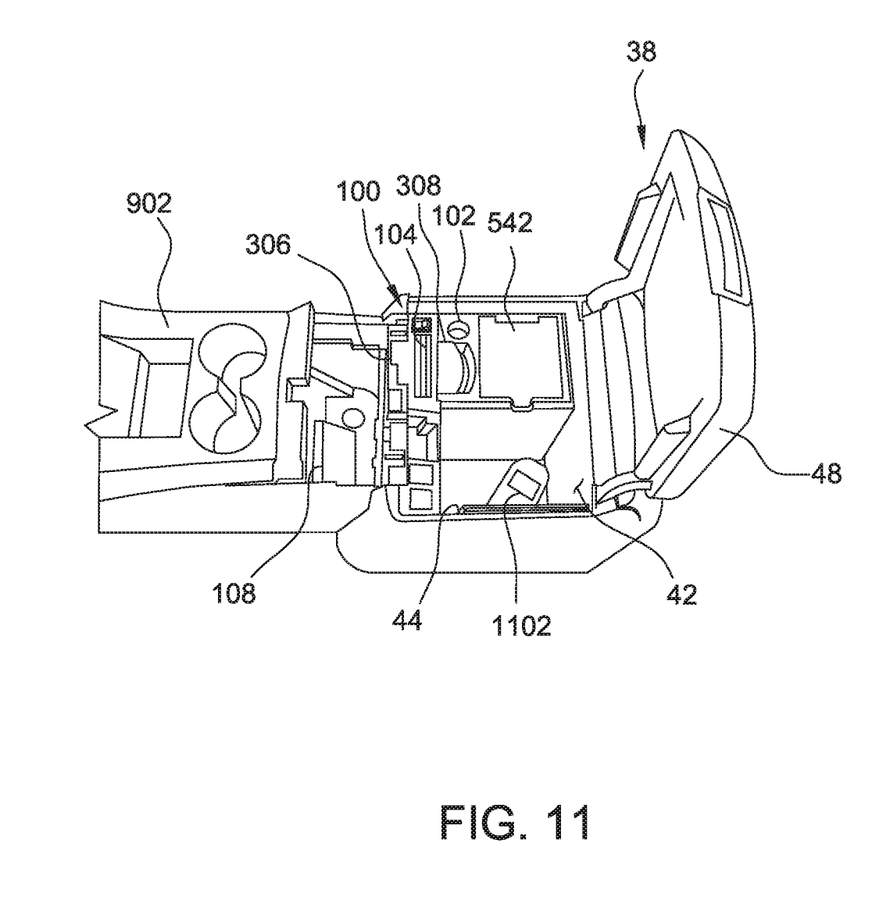

As shown in FIG. 11, the vacuum module 100 is then inserted through the console opening 44 and positioned within the storage cavity 42 such that the inlet 102, the outlet 104, the latch 308, and the access lid 542 face upward and away from the storage cavity 42. The vacuum module 100 is then secured to the console 38 within the storage by engaging the console mounting surface 1002 with the mounting flange 306 of the vacuum module 100.

The vacuum module 100 may also be connected to a suitable power source during installation. In this embodiment, the vacuum module 100 is connected to a dedicated, rechargeable battery 108 via a battery receptacle 1102 during installation. Additionally or alternatively, the vacuum module 100 may be connected to the energy storage device 28 of the vehicle 20 by suitable electrical wires.

Figure 12:
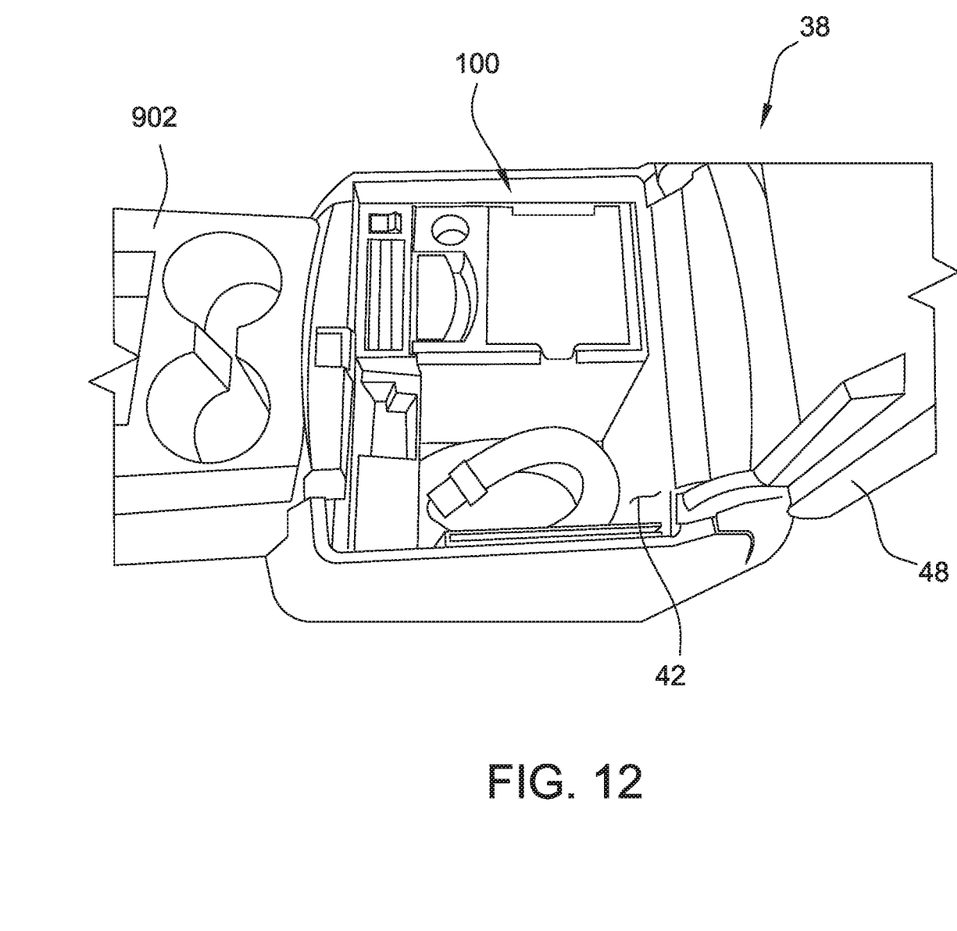

As shown in FIG. 12, once the vacuum module 100 is secured to the console 38, the console panel 902 is replaced and reconnected to the console 38 such that the mounting flange 306 is secured between the console panel 902 and the mounting surface 1002. The console lid 48 may then be closed.

Embodiments of the vacuum modules described herein provide several advantages over prior art devices. For example, embodiments of the vacuum modules described herein provide a fully contained air management system. That is, components of the air management system, such as the suction unit, the inlet, the outlet, the suction flow path, and the filter assembly, are contained entirely within the vacuum module, and thereby facilitate installation of the vacuum module in vehicles as a single unit with little or no vehicle modifications. Consequently, vacuum modules of the present disclosure may be installed by a vehicle manufacturer, a vehicle dealer, or as an after-market component (e.g., by a user of the vehicle). Moreover, because embodiments of the vacuum modules do not require vehicle modifications for installation, such vacuum modules may also be removed from vehicles, and the vehicle reverted back to its original dealer or manufacturer configuration.

Additionally, embodiments of the vacuum modules described herein include a debris container latch that can be operated by a single hand such that the debris container can be installed and removed from the vacuum module with a single hand.

Further, vacuum modules of the present disclosure utilize a common exhaust vent or outlet to which the working air and cooling air from the vacuum module are routed and exhausted. Combining the working air and cooling air facilitates inducing additional cooling air flow to the motor of the vacuum module, and facilitates reducing the temperature of the cooling air exhaust flow by diluting it with relatively cool working air of the vacuum module.

Moreover, embodiments of the vacuum module described herein are selectively useable as a trash receptacle. For example, embodiments of the vacuum modules include an access lid that provides selective access to the interior of the debris container such that trash or other waste can be easily disposed of into the debris container. Moreover, vacuum modules of the present disclosure also include an adapter that prevents or inhibits trash within the debris container from falling down into the blower or motor compartments.

Example embodiments of vacuum modules are described above in detail. The vacuum modules are not limited to the specific embodiments described herein, but rather, components of the vacuum modules may be used independently and separately from other components described herein. For example, the modules described herein may be used in vehicles other than automotive vehicles, including without limitation a recreational vehicle, a watercraft, or an aircraft.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A vehicle comprising:
   a console located in a passenger compartment of the vehicle, the console defining a storage cavity and an opening in a top of the console that provides access to the storage cavity; and
   a vacuum module installed in the console and including an inlet, an outlet, and a receptacle, the vacuum module further including:
     a housing defining the receptacle, the housing including a mounting flange that engages a mounting surface of the console to secure the vacuum module within the storage cavity;
     a debris container received within the receptacle and removably connected to the housing by a latch, the debris container including a filter assembly removably connected to a base of the debris container; and
     a motor connected to the housing and operable to generate air flow through the debris container from the inlet to the outlet;
   wherein the vacuum module defines a single unit removable from the console; and
   wherein the debris container includes an access opening and an access lid connected to a top of the debris container, the access lid selectively moveable between an open position, in which an interior of the debris container is accessible through the access opening, and a closed position, in which the access lid occludes the access opening.

2. The vehicle of claim 1, wherein the vacuum module further includes a battery connected to the motor for supplying power thereto.

3. The vehicle of claim 2, wherein the battery is connected to a battery of the vehicle by a wire having a gauge size no larger than 16 AWG to permit trickle charging of the vacuum module battery.

4. The vehicle of claim 1, wherein the housing defines the outlet, and the debris container defines the inlet.

5. The vehicle of claim 1, wherein the housing defines a motor compartment in which the motor is located, the motor compartment separated from a suction flow path by a housing panel, wherein the housing panel includes an opening therein that provides fluid communication between the motor compartment and the suction flow path such that air flow along the suction flow path induces a cooling air flow through the motor compartment.

6. The vehicle of claim 5, wherein the outlet is a common exhaust outlet through which both the cooling air flow and suction air flow are exhausted.

7. The vehicle of claim 1, wherein the debris container defines a vacuum opening providing fluid flow between the inlet and the outlet, the debris container including a mounting boss extending from the base and around the vacuum opening, wherein the filter assembly is removably connected to the mounting boss so as to filter air flowing through the vacuum opening.

8. The vehicle of claim 7, further including an adapter removably connectable to the mounting boss when the filter assembly is disconnected from the mounting boss, wherein the adapter seals the vacuum opening when the adapter is connected to the mounting boss.

9. The vehicle of claim 7, wherein the filter assembly is removably connected to the mounting boss by a bayonet connection.

10. The vehicle of claim 1, wherein the console is mounted to a floor of the vehicle and located between two seats of the vehicle.

11. The vehicle of claim 1, wherein the console is a center console of the vehicle.

12. The vehicle of claim 1, wherein the console further includes a lid selectively moveable between an open position, in which the vacuum module is accessible through the opening in the console, and a closed position, in which the lid covers the storage cavity and the vacuum module.

13. The vehicle of claim 1, wherein the vehicle includes a battery, and wherein the vacuum module is electrically connected to the battery such that the motor is powered by the vehicle battery.

14. A method of installing a vacuum module in a vehicle, the vacuum module including a housing defining a receptacle, a debris container received within the receptacle and removably connected to the housing by a latch, a filter assembly removably connected to a base of the debris container, and a motor connected to the housing and operable to generate air flow through the debris container, the debris container includes a first access opening and a top of the debris container, the method comprising:
   positioning the vacuum module within a storage cavity of a console of the vehicle located in a passenger compartment of the vehicle;
   securing the vacuum module within the storage cavity by engaging a mounting surface of the console with a mounting flange of the vacuum module housing; and
   securing an access lid to the top of the debris container, the access lid selectively moveable between an open position, in which an interior of the debris container is accessible through the first access opening, and a closed position, in which the access lid occludes the first access opening.

15. The method of claim 14 further including:
   removing at least a console panel to expose the mounting surface; and
   replacing the console panel after the mounting flange engages the mounting surface such that the mounting flange is secured between the console panel and the mounting surface.

16. The method of claim 15 further including removing an accessory tray from the storage cavity prior to securing the vacuum module.

17. The method of claim 14, wherein the console includes a lid and a second access opening providing access to the storage cavity, the method further including:
   moving the lid to an open position;
   inserting the vacuum module through the second access opening and into the storage cavity; and
   closing the lid after the vacuum module is secured to the console.

18. A vacuum module for installation in a console located in a passenger compartment of a vehicle, the vacuum module comprising:

a housing defining a receptacle and including a mounting flange that engages a mounting surface of the console to secure the vacuum module within a storage cavity of the console;

a debris container received within the receptacle and removably connected to the housing by a latch, the debris container including a filter assembly removably connected to a base of the debris container; and a motor connected to the housing and operable to generate air flow through the debris container from an inlet of the vacuum module to an outlet of the vacuum module;

wherein the vacuum module defines a single unit removable from the console;

wherein the debris container includes an access opening and an access lid connected to a top of the debris container, the access lid selectively moveable between an open position, in which an interior of the debris container is accessible through the access opening, and a closed position, in which the access lid occludes the access opening.

* * * * *